(12) United States Patent
Lin et al.

(10) Patent No.: US 8,144,408 B2
(45) Date of Patent: Mar. 27, 2012

(54) LENS MODULE HAVING INTERCOUPLING SLIT AND HANDLE

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 36 days.

(21) Appl. No.: 12/730,260

(22) Filed: Mar. 24, 2010

(65) Prior Publication Data

US 2010/0265599 A1 Oct. 21, 2010

(30) Foreign Application Priority Data

Apr. 20, 2009 (CN) .......................... 2009 1 0301673

(51) Int. Cl.
*G02B 7/02* (2006.01)
(52) U.S. Cl. .......................... 359/823; 359/813; 359/819
(58) Field of Classification Search .................. 359/811, 359/813, 819, 822–824
See application file for complete search history.

(56) References Cited

U.S. PATENT DOCUMENTS 7,480,109 B1* 1/2009 Hu et al. ........................ 359/824
7,605,991 B2* 10/2009 Chiang .......................... 359/811

* cited by examiner

*Primary Examiner* — Ricky Mack
*Assistant Examiner* — Brandi Thomas
(74) *Attorney, Agent, or Firm* — Altis Law Group, Inc.

(57) ABSTRACT

An exemplary lens module includes a holder, a lens barrel, a cover having a through hole, a restricting member having a slit, a handle extending from the lens barrel and a resilient. The lens barrel is accommodated in the holder capable of moving along a central axis of the holder. The cover covers the lens barrel and is detachably fixed on the holder. The restricting member is over the cover. The handle penetrates the through hole and the slit. The resilient member is sandwiched between the cover and the lens barrel, capable of changing the length thereof under an external force and recovering the original length with the external force withdrawn, such that a focal length of the lens module is adjustable by moving the handle in and along the slit.

17 Claims, 8 Drawing Sheets

LENS MODULE HAVING INTERCOUPLING SLIT AND HANDLE

BACKGROUND

1. Technical Field

The present disclosure relates to a lens module, and more particularly, a lens module having intercoupling slit and handle.

2. Description of Related Art

A conventional zoom lens module generally includes at least one lens, an image sensor and an actuator, such as a step motor for driving the lenses to move relative to the image sensor for obtaining a desired focal length. However, the zoom lens module is expensive. Furthermore, the step motor is relatively large in volume, thus a significant amount of space is needed for movement of the lenses, which makes it very difficult to reduce a volume of the lens module.

Therefore, a lens module to overcome the problems described above is needed.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of embodiments of the lens module. Moreover, in the drawings, all the views are schematic, and like reference numerals designate corresponding parts throughout the different views.

DETAILED DESCRIPTION

Figure 1:
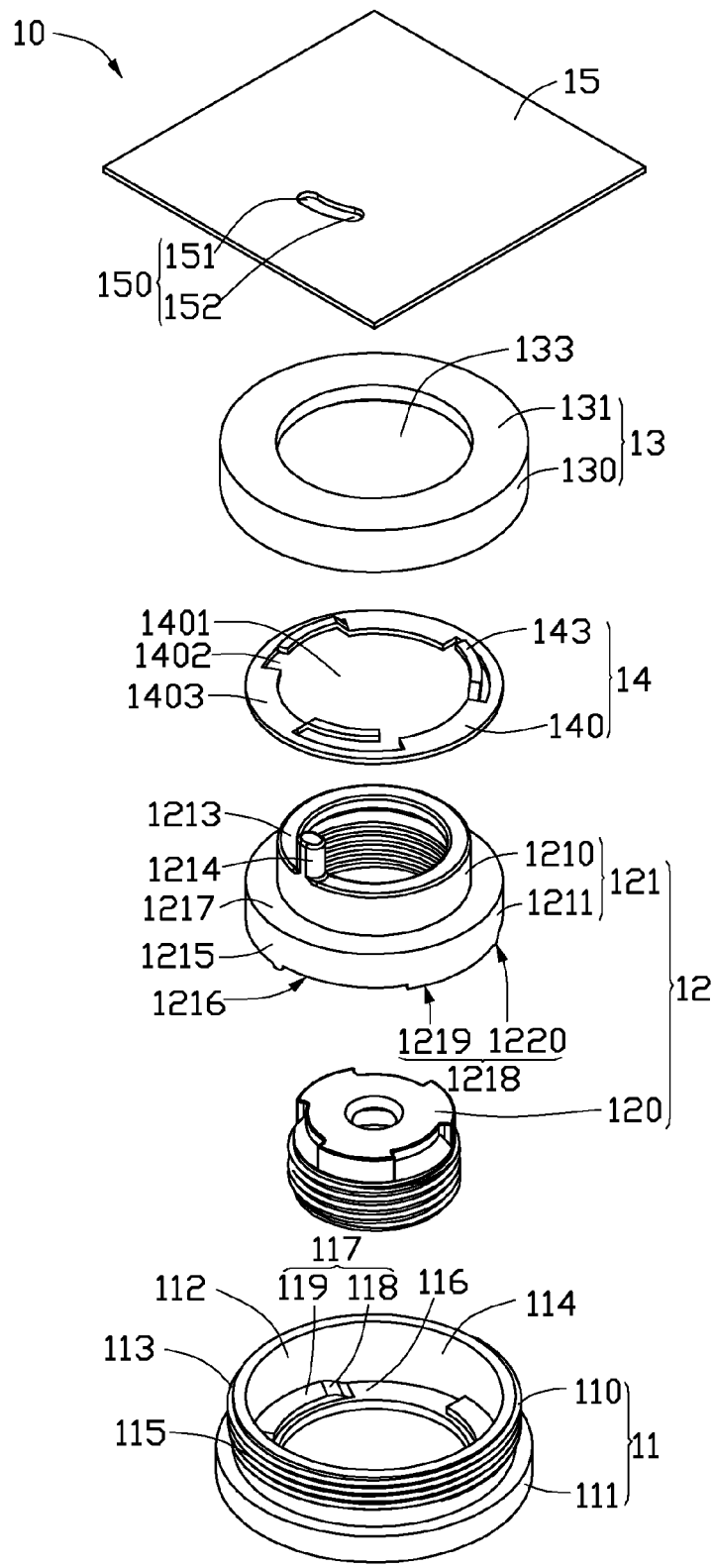
FIG. 1 is a schematic, exploded view of a lens module in accordance with a first embodiment.

Referring to FIGS. 1-4, a lens module 10 provided in a first embodiment includes a holder 11, a lens barrel 12, a resilient member 14, a cover 13 and a restricting member 15.

Referring to FIG. 1, the holder 11 includes a first hollow cylinder 111 for accommodating an image sensor (not shown) and a second hollow cylinder 110 for accommodating the lens barrel 12. The second cylinder 110 has an inner surface 112, an outer surface 113 opposite to the inner surface 112, and outer threads 115 formed on the outer surface 113. An inner diameter of the first cylinder 111 is greater than that of the second cylinder 110, and an outer diameter of the first cylinder 111 is less than that of the second cylinder 111. That is, the second cylinder 110 is thicker than the first cylinder 111, and an annular portion of an end surface (not labeled) of the first cylinder 111, here defined as a supporting surface 116, is accessible from the second cylinder 110. Three arc-shaped steps 117 arrange equidistantly on the supporting surface 116. Each step 117 has a carrying surface 119 parallel to the supporting surface 116 and a sloping end surface 118 interconnecting the carrying surface 119 and the supporting surface 116. The sloping end surface 118 also intersects with the inner surface 112 of the second cylinder 110 on a curve. In this manner, three sloping end surfaces 118 arrange uniformly, and the step 117 has a gradually increase in height in the sloping end surface 118 along a direction from the supporting surface 116 upward.

Referring to FIG. 1, the lens barrel 12 includes an inner barrel 120 for accommodating optical elements, such as optical lenses, spacers, filters etc. In addition, the lens barrel 12 further includes an outer barrel 121 for threadedly engaging the inner barrel 12.

Figure 2:
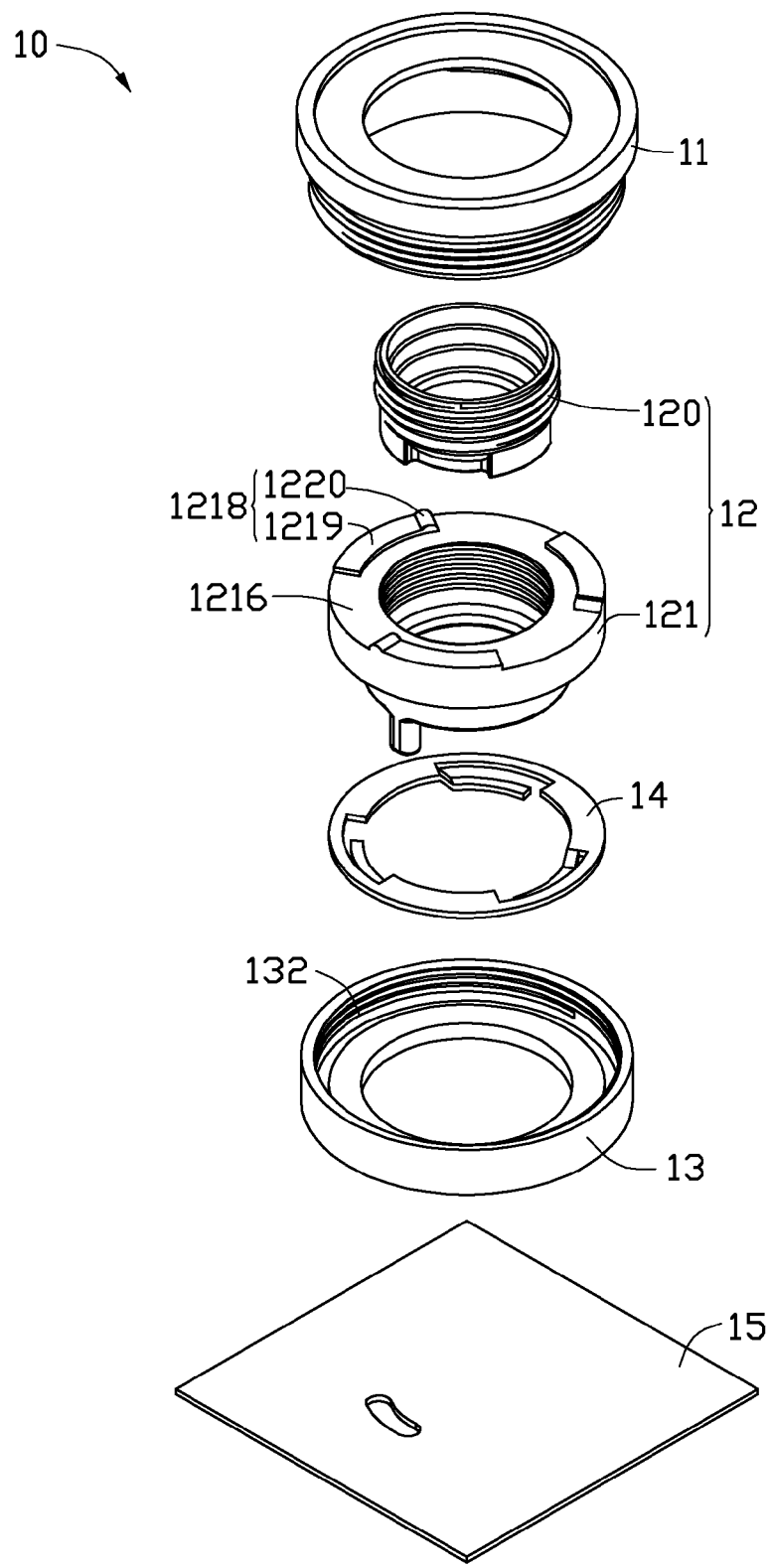
FIG. 2 shows another isometric, exploded view of the lens module of FIG. 1.

Referring to FIGS. 1 and 2, the outer barrel 121 includes a hollow coupling cylinder 1211. The coupling cylinder 1211 has a first end surface 1217, a second end surface 1216, a side surface 1215 interconnecting the first end surface 1217 and the second end surface 1216. Three arc-shaped coupling members 1218 are equidistantly formed on the second end surface 1216. The coupling cylinder 1211 is detachably accommodated in the second cylinder 110 with the side surface 1215 contacting the inner surface 112, capable of rotating around and moving along a central axis of the second cylinder 110. Referring to FIG. 2, each coupling member 1218 includes an arc-shaped plate 1219 and a hemispherical protrusion 1220 protruding from an end portion of the arc-shaped plate 1219. A length of the plate 1219 is substantially equal to the distance between every two neighboring steps 117, and a distance between every two neighboring coupling members 1218 is substantially equal to that between every two neighboring steps 117. As such, the coupling member 1218 can be restricted between two neighboring steps 117.

Additionally, referring to FIG. 1, the outer barrel 121 further includes a hollow accommodating cylinder 1210 perpendicularly and coaxially extending from the first end surface 1217 of the coupling member 1211. Narrower than the coupling member 1211, the accommodating cylinder 1210 configures for threadedly engaging with the inner barrel 120. The accommodating cylinder 1210 has a third end surface 1213 parallel to the first end surface 1217 of the coupling cylinder 1211. A handle 1214 perpendicularly extends from the third end surface 1213 of the accommodating cylinder 1210.

Figure 4:
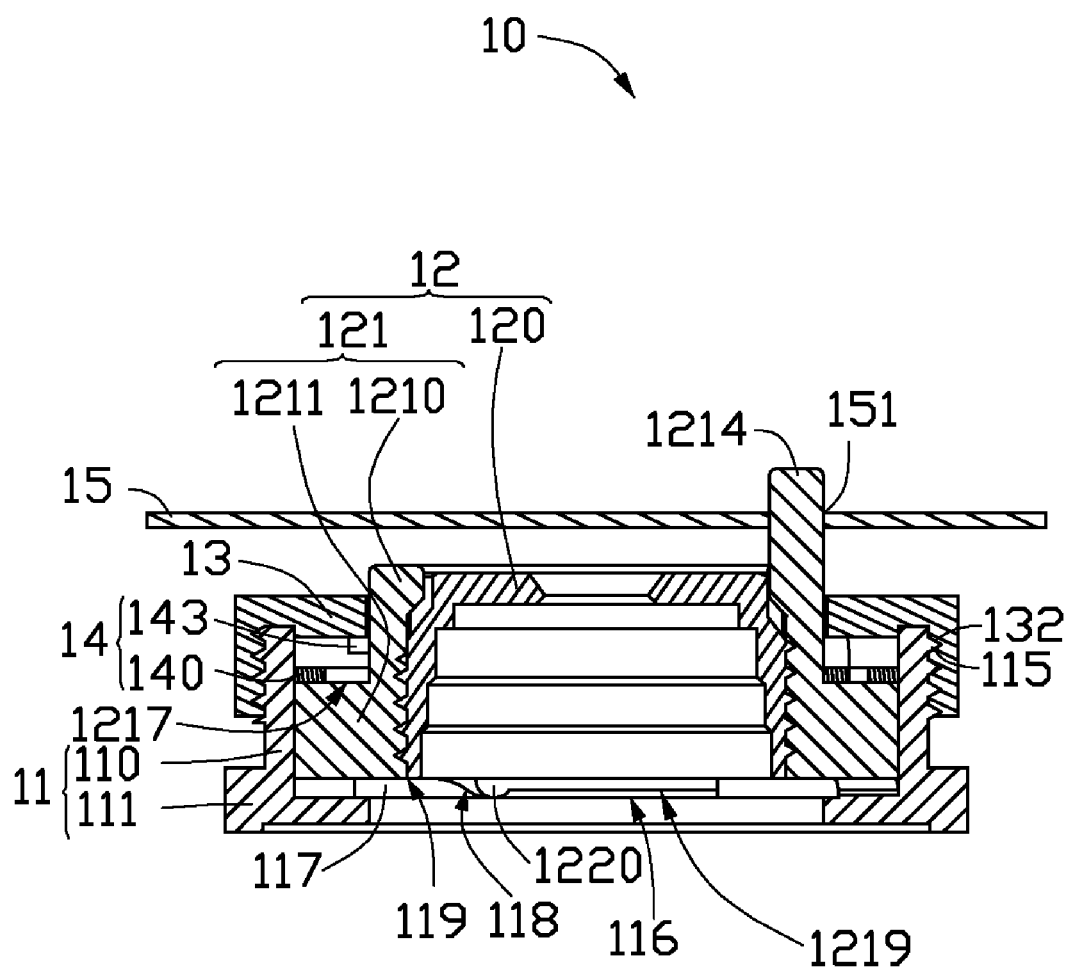
FIG. 4 is a sectional view of the lens module of FIG. 1, corresponding to line IV-IV.

Referring to FIGS. 2 and 4, the cover 13 has inner threads 132 formed in an inner surface thereof, which corresponds to the outer threads 115 of the second cylinder 110. The cover 13 can be detachably mounted on the second cylinder 110 with the inner threads 132 being mated with the outer threads 115. Referring to FIG. 1, the cover 13 also has a through hole 133 in the central portion thereof. A diameter of the through hole 133 is greater than that of the accommodating cylinder 1210 but less than that of the coupling member 1211.

Referring to FIGS. 1 and 4, the resilient member 14 is detachably sandwiched between the cover 13 and the coupling cylinder 1211. The resilient member 14 has a ring-shaped plate 140. The ring-shaped plate 140 has an opening 1401 in the center thereof, and three grooves 1402 equidistantly around and communicating with the opening 1401. Therefore, a wider connection section 1403 between every two neighboring grooves 1402 is obtained. The opening 1401 is wider than the accommodating cylinder 1210 and narrower than the coupling cylinder 1211. That is, the resilient member 14 is assembled on the first end surface 1217 of the coupling cylinder 1211, and the accommodating cylinder 1210 and the handle 1214 pass through the plate 140. Three elongated tabs 143 are uniformly stamped out from the plate 140. When not under stressed condition, the tabs 143 are substantially parallel with the plate 140. When under completely compression, the tabs 143 fill the grooves 1402 and are coplanar with the plate 140.

The restricting member 15 has an arc-shaped slit 150 for fittingly accommodating the handle 1214. The slit 150 has a first end 151 and a second end 152. In actual use, the restricting member 15 is transparent and fixed on a body of an electronic device, such as a mobile phone, a portable computer, etc. The restricting member 15 is also configured for preventing contaminants entering the lens module 10.

Referring to FIGS. 1, 2, 3 and 4, in assembly of the lens module 10, the inner barrel 120 is first screwed into the outer barrel 121 to form the lens barrel 12. The lens barrel 12 is then put into the second cylinder 110 of the holder 11 with the protrusions 1216 contacting the supporting surface 116 of the first cylinder 111. The resilient member 14 is subsequently mounted on the first end surface 1217 of the coupling cylinder 1211 with the surrounding accommodating cylinder 1210. The cover 13 screws onto the second cylinder 110 of the holder 11 with the tabs 143 not under stressed condition. The restricting member 15 is fixed over the cover 13 with the handle 1214 passing through the resilient member 14 and blocked at the first end 151 of the restricting slit 150. In this situation, a first desired focal length of the lens module 10 is obtained.

Figure 3:
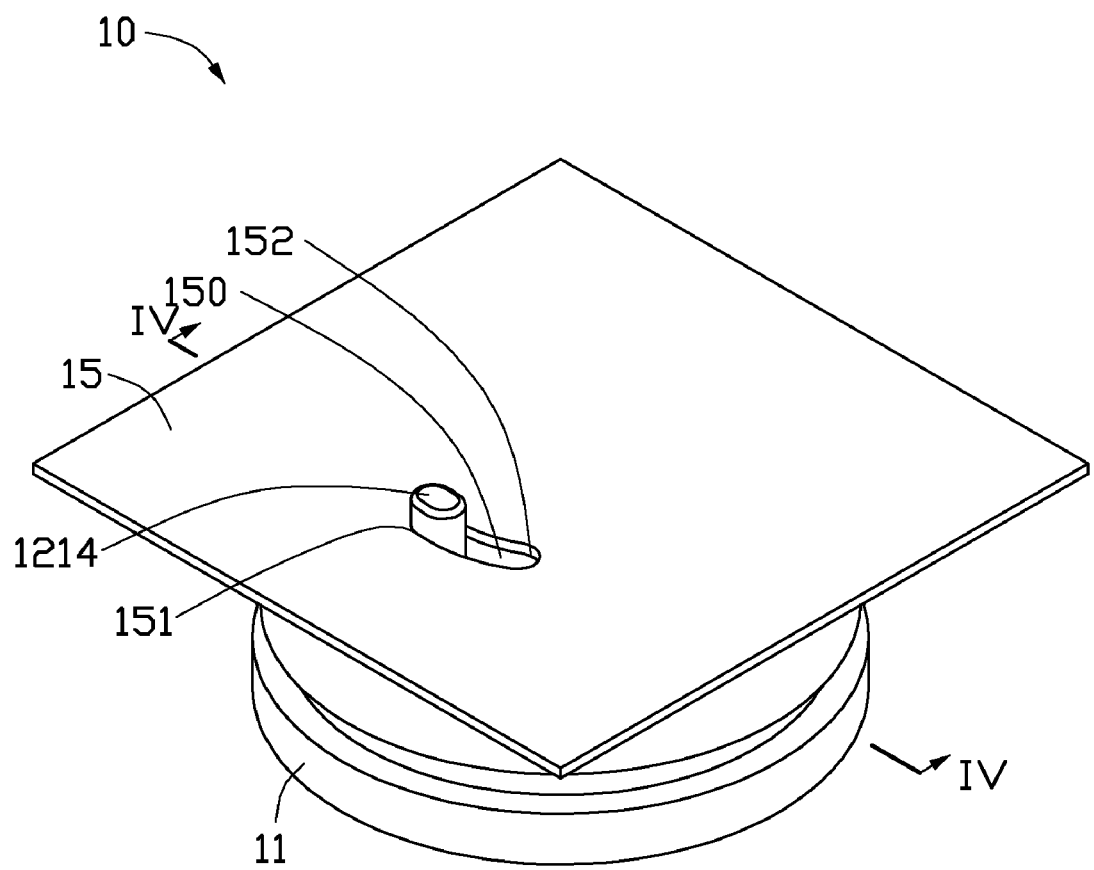
FIG. 3 shows a schematic, and perspective view of the lens module of FIG. 1.
Figure 5:
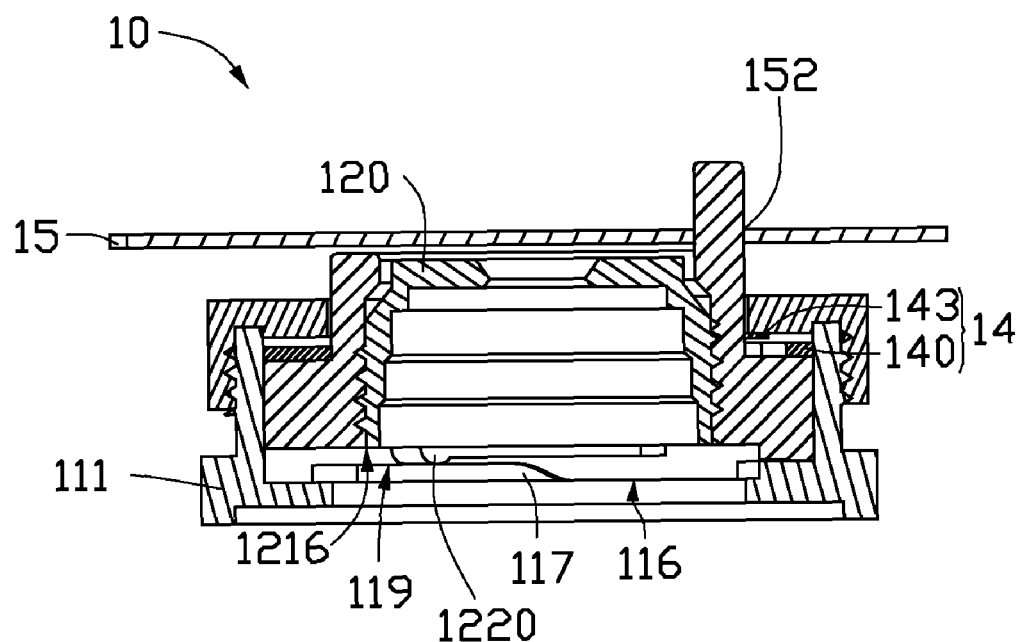
FIG. 5 shows the lens module of FIG. 1 in a focus state.

Referring to FIGS. 1, 3 and 5, when moving the handle 1214 in the slit 150, the coupling member 1218 of the coupling cylinder 1211 is simultaneously movable in a direction from the supporting surface 116 to the carrying surface 119 via the sloping end surface 118 of the step 117, and the tabs 143 are stressed. When restricting the handle 1214 at the second end 152 of the slit 150, the protrusions 1220 holds to the carrying surface 119, the tabs 143 fill the grooves 1402 and become coplanar with the plate 140. Therefore, a distance between the inner barrel 120 and the first cylinder 111, i.e., a distance between optical lenses and imaging sensor, shortens. In such way, a second desired focal length of the lens module 10 is obtained.

Figure 6:
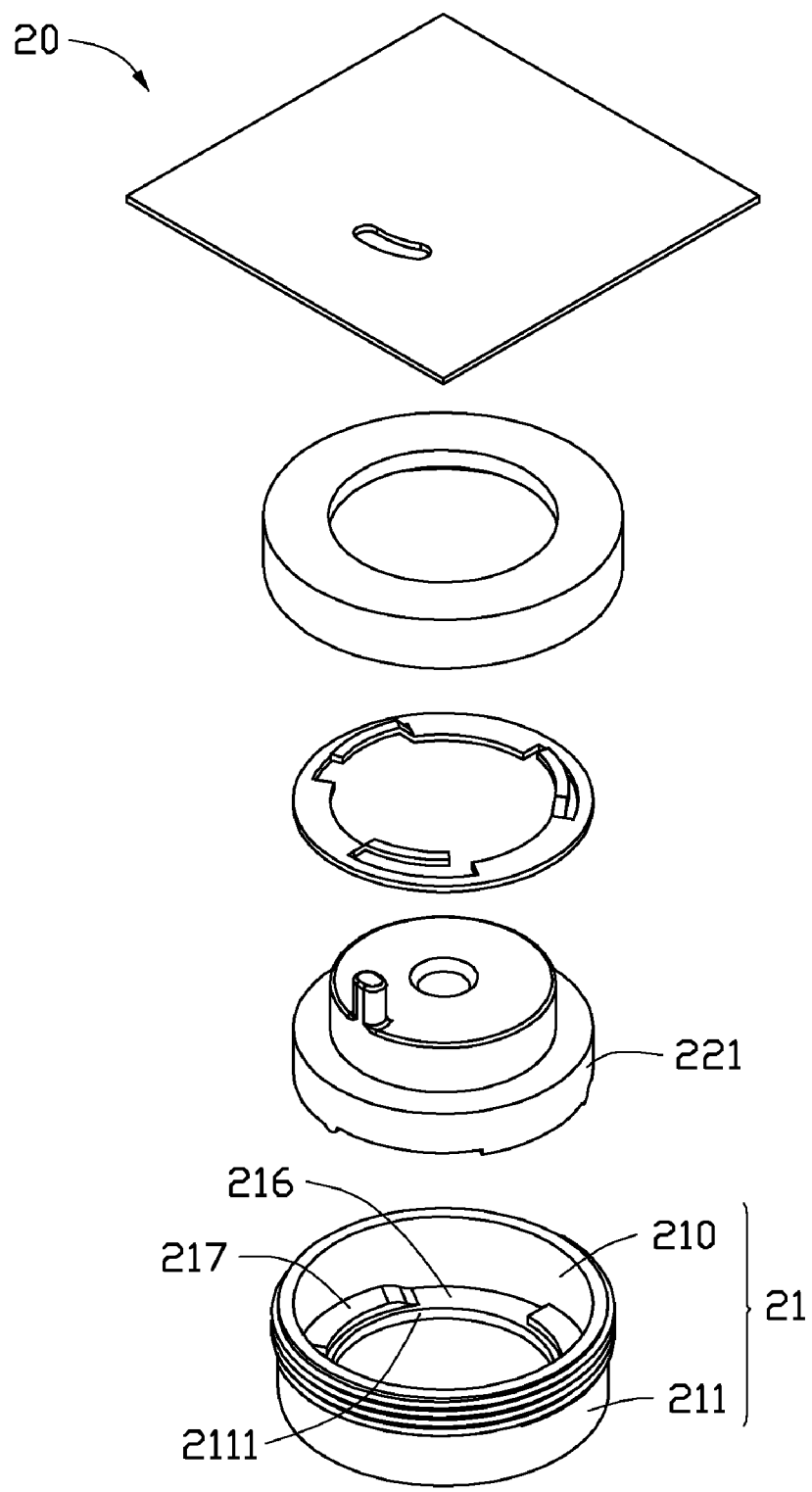
FIG. 6 is an isometric, exploded view of a lens module in accordance with a second embodiment.

Referring to FIG. 6, a lens module 20 provided in a second embodiment has similar configuration with the lens module 10, differing in that the outer barrel 121 is used for accommodating optical members. In addition, the holder 21 includes the first cylinder 211 and the second cylinder 210 substantially wider than the first cylinder 211. The first cylinder 211 has an annular supporting element 2111 coaxially fixed therein. The steps 217 are equidistantly formed on the supporting surface 216 of the supporting member 2111.

Figure 7:
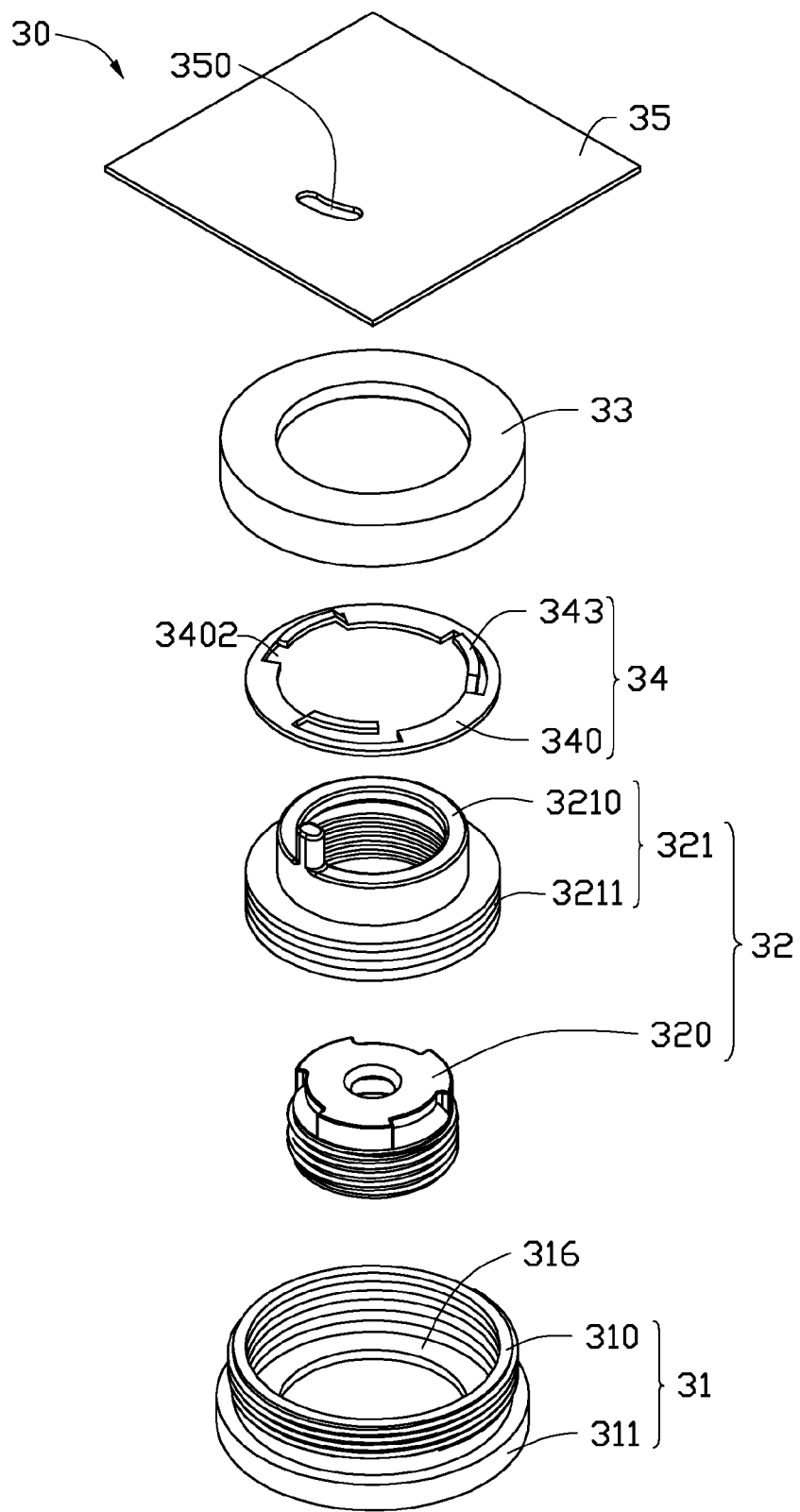
FIG. 7 is an isometric, exploded view of a lens module in accordance with a third embodiment.

Referring to FIG. 7, a lens module 30 provided in a third embodiment has similar configuration with the lens module 10. In detail, the lens module 30 includes a holder 31, a lens barrel 32, a resilient member 34, a cover 33 and a restricting member 35. The holder 31 includes a first hollow cylinder 311 and a second hollow cylinder 310 coaxially connecting the first cylinder 311. The first hollow cylinder 311 is wider and thicker than the second hollow cylinder 310, and has an annular supporting surface 316 exposed from the second hollow cylinder 310. The lens barrel 32 includes an accommodating cylinder 3210 and a coupling cylinder 3211. The resilient member 34 includes an annular plate 340 and three tabs 343. The restricting member 35 has an arc-shaped slit 350.

The lens module 30 differs from the lens module 10 in that the inner barrel 320 and the coupling cylinder 3211 are respectively threadedly engaged in the accommodating cylinder 3210 of the outer barrel 321 and the second cylinder 310. When moving the handle 3214 in and along the slit 350, the outer barrel 121 rotates around and moves toward the cover 33 along the central axis of the second cylinder 310. Simultaneously, the juncture element 342 and the valve element 343 stress the resilient member 34 until entering into the grooves 3402 of the plate 340. Therefore, the focal length of the lens module 30 is changed.

Figure 8:
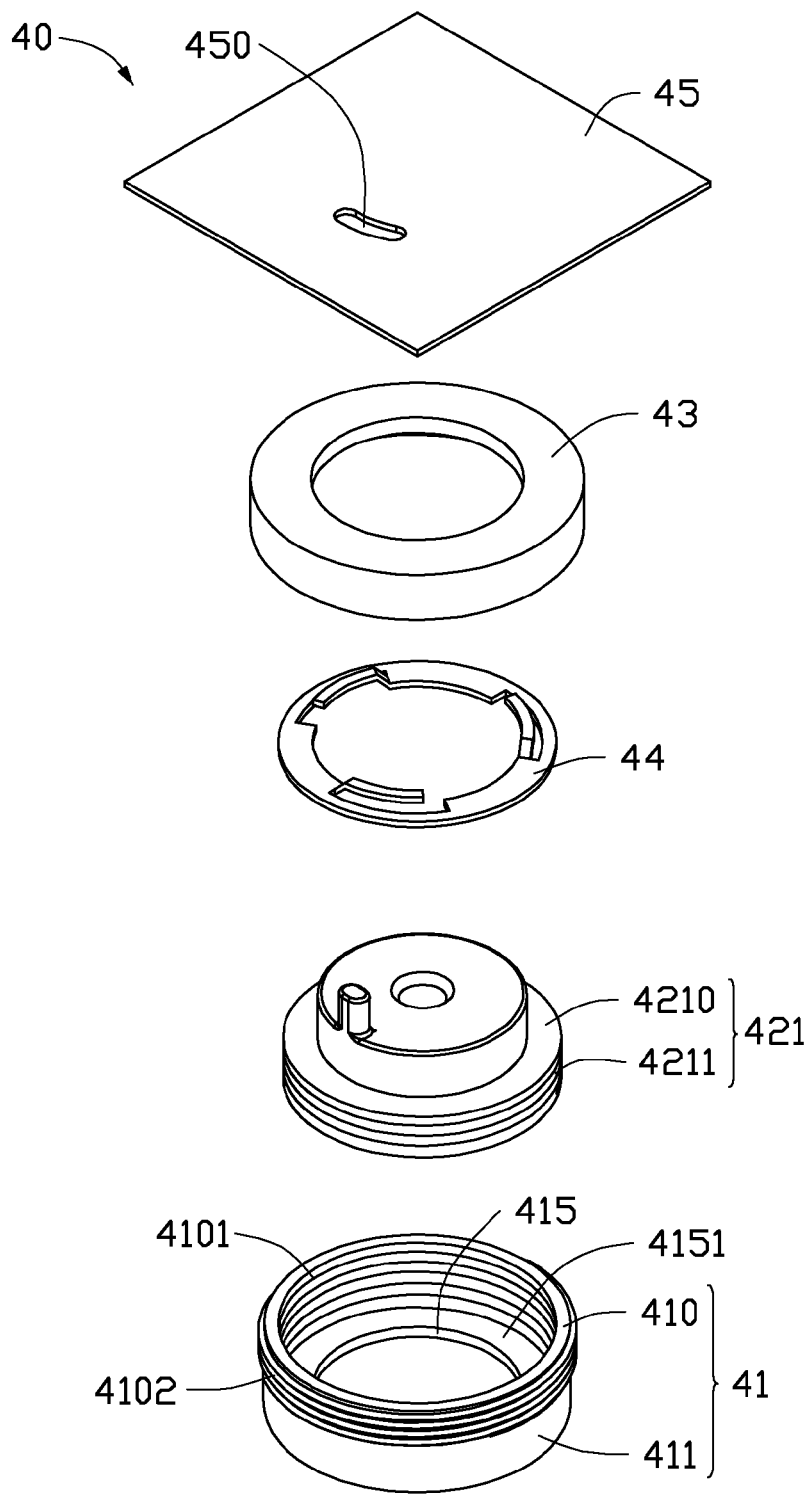
FIG. 8 is an isometric, exploded view of a lens module in accordance with a fourth embodiment.

Referring to FIG. 8, a lens module 40 provided in a fourth embodiment has similar configuration with the lens module 30. In detail, the lens module 40 includes a cylinder holder 41, a lens barrel 421, a resilient member 44, a cover 43 and a restricting member 45. The lens barrel 421 includes an accommodating cylinder 4210 and a coupling cylinder 4211. The restricting member 45 has an arc-shaped slit 450.

The lens module 40 differs from the lens module 30 in that the accommodating cylinder 4210 is for accommodating optical members. The holder 41 includes an annular supporting element 415 fixed on an intermediate portion of an inner surface thereof. The supporting element 415 has a supporting surface 4151. The holder 41 includes a first portion 411 and a second portion 410 substantially wider than the first portion 411. The second portion 410 has inner screws 4101 mated with the screws (not labeled) of the coupling cylinder 4211 and outer screws 4102 mated with the screw (not shown) of the cover 43.

While certain embodiments have been described and exemplified above, various other embodiments will be apparent from the foregoing disclosure to those skilled in the art. The present disclosure is not limited to the particular embodiments described and exemplified but is memberable of considerable variation and modification without departure from the scope and spirit of the appended claims.

What is claimed is:

1. A lens module, comprising:
   a holder having a central axis associated therewith;
   a lens barrel accommodated in the holder, the lens barrel being rotatable about the central axis of the holder and movable along the central axis of the holder;
   a cover having a through hole, the cover covering the lens barrel and detachably mounted on the holder;
   a restricting member over the cover, the restricting member having an arc-shaped slit;
   a handle integrally extending from the lens barrel, the handle extending through the through hole and the slit, and the handle being movable along the arc-shaped slit for driving the lens barrel to rotate about the central axis of the holder and thereby move along the central axis of the holder; and
   a compressible resilient member sandwiched between the cover and the lens barrel.

2. The lens module of claim 1, wherein the lens barrel is threadedly engaged in the holder.

3. The lens module of claim 2, wherein the holder includes a first hollow cylinder and a second hollow cylinder coaxially connected to the first cylinder, an annular supporting surface is formed in the first cylinder and accessible through the second cylinder, and the lens barrel is accommodated in the second cylinder.

4. The lens module of claim 2, wherein the holder includes a hollow cylinder and an annular supporting element formed in the cylinder for supporting the lens barrel.

5. The lens module of claim 2, wherein the lens barrel includes an outer barrel and an inner barrel for accommodating optical members, the inner barrel, the outer barrel and the holder are threadedly engaged with one another, and the handle extends from the outer barrel.

6. The lens module of claim 1, wherein the resilient member comprises a ring-shaped plate and a plurality of elongated tabs stamped out from the plate and substantially parallel with the plate.

7. The lens module of claim 6, wherein the resilient member further comprises an opening and a plurality of grooves equidistantly arranged around and communicating with the opening, and the tabs fill the grooves when the resilient member is completely compressed.

8. The lens module of claim 1, wherein the holder comprises an annular supporting surface therein, and a plurality of steps formed on the supporting surface with different heights relative to the supporting surface, each step has a sloping end surface, the handle extends from one end of the lens barrel, the lens barrel comprises a plurality of coupling members at an opposite end thereof, the coupling members are arranged along a circumference of the opposite end of the lens barrel, and the coupling members are for abutting against the steps.

9. The lens module of claim 8, wherein the holder further comprises a first hollow cylinder and a second hollow cylinder coaxially connected to the first cylinder, the first cylinder has the supporting surface supporting the lens barrel, and the lens barrel is accommodated in the second cylinder.

10. The lens module of claim 8, wherein the lens barrel further comprises an outer barrel and an inner barrel for accommodating optical members, the inner barrel is threadedly engaged in the outer barrel, and the coupling members and the handle are respectively formed on opposite end surfaces of the outer barrel.

11. The lens module of claim 9, wherein each coupling member comprises a protrusion.

12. The lens module of claim 11, wherein each coupling member further comprises an arc-shaped plate, and the protrusion is formed on the plate.

13. A lens module, comprising:
  a holder having a central axis associated therewith, and comprising an annular supporting surface therein, and a plurality of steps formed on the supporting surface with different heights relative to the supporting surface, with each step having a sloping end surface;
  a lens barrel accommodated in the holder, the lens barrel being rotatable about the central axis of the holder and movable along the central axis of the holder;
  a cover having a through hole, the cover covering the lens barrel and detachably mounted on the holder;
  a restricting member over the cover, the restricting member having a slit;
  a handle extending from one end of the lens barrel, the handle extending through the through hole and the slit; and
  a compressible resilient member sandwiched between the cover and the lens barrel;
  wherein the lens barrel comprises a plurality of coupling members at an opposite end thereof, the coupling members are arranged along a circumference of the opposite end of the lens barrel, and the coupling members are for abutting against the steps.

14. The lens module of claim 13, wherein the holder further comprises a first hollow cylinder and a second hollow cylinder coaxially connected to the first cylinder, the first cylinder has the supporting surface supporting the lens barrel, and the lens barrel is accommodated in the second cylinder.

15. The lens module of claim 14, wherein each coupling member comprises a protrusion.

16. The lens module of claim 15, wherein each coupling member further comprises an arc-shaped plate, and the protrusion is formed on the plate.

17. The lens module of claim 13, wherein the lens barrel further comprises an outer barrel and an inner barrel for accommodating optical members, the inner barrel is threadedly engaged in the outer barrel, and the coupling members and the handle are respectively formed on opposite end surfaces of the outer barrel.

* * * * *